(12) United States Patent
Cerv et al.

(10) Patent No.: US 11,391,443 B2
(45) Date of Patent: Jul. 19, 2022

(54) LED LAMP COMPONENT HAVING REFLECTIVE/REFRACTIVE ELEMENT WITHIN TRANSLUCENT HOUSING

(71) Applicant: Zumtobel Lighting GmbH, Dornbirn (AT)

(72) Inventors: Simon Cerv, Dornbirn (AT); Patrik Gassner, St. Gerold (AT); Gerald Ladstätter, Klaus (AT); Bogna Ludwiczak-Osterloher, Scheidegg (DE); Andreas Machate, Wangen im Allgäu (DE)

(73) Assignee: Zumtobel lighting GmbH, Dornbirn (AT)

( * ) Notice: Subject to any disclaimer, the term of this patent is extended or adjusted under 35 U.S.C. 154(b) by 0 days.

(21) Appl. No.: 17/268,545

(22) PCT Filed: Sep. 5, 2019

(86) PCT No.: PCT/EP2019/073646
§ 371 (c)(1),
(2) Date: Feb. 15, 2021

(87) PCT Pub. No.: WO2020/057985
PCT Pub. Date: Mar. 26, 2020

(65) Prior Publication Data
US 2021/0332968 A1 Oct. 28, 2021

(30) Foreign Application Priority Data

Sep. 20, 2018 (EP) .................................... 18195636
Jan. 18, 2019 (GB) .................................... 1900959

(51) Int. Cl.
*F21V 5/04* (2006.01)
*F21V 15/01* (2006.01)
(Continued)

(52) U.S. Cl.
CPC ............ *F21V 15/013* (2013.01); *B29C 48/22* (2019.02); *F21S 4/22* (2016.01); *F21V 5/04* (2013.01);
(Continued)

(58) Field of Classification Search
CPC .......... F21V 5/04; F21V 7/0016; F21V 13/04; F21V 15/013; F21S 4/22; F21S 8/046
See application file for complete search history.

(56) References Cited

U.S. PATENT DOCUMENTS 1,472,050 A * 10/1923 Curtis ..................... F21S 13/00
                                                     362/307
2,436,635 A *  2/1948 Bishop, Jr. ................ F21S 8/04
                                                     362/224
(Continued)

FOREIGN PATENT DOCUMENTS

DE        3704501 A1 *  9/1987  ............ F21V 7/0025
EP        2896876 A1 *  7/2015  ................ F21S 8/06
WO    2016/102512         6/2016

OTHER PUBLICATIONS

PCT Search Report dated Nov. 6, 2019 in parent PCT application PCT/EP2019/073646.

*Primary Examiner* — Ismael Negron
(74) *Attorney, Agent, or Firm* — Andrus Intellectual Property Law, LLP (57) ABSTRACT

The lamp component includes a light orienting element having a light incident end, a light output end opposite the light incident end, and a side surface extending between the light incident and light output ends; and a housing configured to position the light orienting element adjacent a light source. The housing is at least partially translucent, and includes at least one sidewall and a main wall facing the light output end. The light orienting element is configured to deflect a fraction of the incident light towards the light (Continued)

output surface to be projected through the main wall as to direct light, and a fraction of the light towards the at least one housing sidewall to be projected as indirect light. The light orienting element is a first part formed by extrusion in a first direction, and the housing is a second part formed by extrusion in a first direction.

23 Claims, 5 Drawing Sheets

(51) Int. Cl.
*F21S 4/22* (2016.01)
*B29C 48/22* (2019.01)
*F21V 7/00* (2006.01)
*F21V 8/00* (2006.01)
*F21Y 115/10* (2016.01)

(52) U.S. Cl.
CPC .......... *F21V 7/0016* (2013.01); *G02B 6/0025* (2013.01); *G02B 6/0045* (2013.01); *F21Y 2115/10* (2016.08)

(56) References Cited

U.S. PATENT DOCUMENTS

| | | | | |
|---|---|---|---|---|
| 2,499,580 | A * | 3/1950 | Hamel | F21V 13/04 D26/136 |
| 2,675,466 | A * | 4/1954 | Baker | F21V 7/0016 362/408 |
| 4,974,137 | A * | 11/1990 | Evans, Jr. | F21S 8/06 362/348 |
| 5,988,836 | A * | 11/1999 | Swarens | F21S 8/02 362/303 |
| 6,161,939 | A * | 12/2000 | Bansbach | F21S 8/061 362/346 |
| 7,988,337 | B2 * | 8/2011 | Huang | F21V 7/0091 362/307 |
| 8,002,446 | B1 * | 8/2011 | Plunk | F21S 8/061 362/365 |
| 9,182,101 | B2 * | 11/2015 | Nakamura | F21V 7/0008 |
| 9,494,293 | B2 * | 11/2016 | Pickard | F21V 5/04 |
| 10,876,708 | B1 * | 12/2020 | He | F21S 4/28 |
| 2010/0321921 | A1 | 12/2010 | Ivey | |
| 2011/0305024 | A1 * | 12/2011 | Chang | F21V 5/02 362/294 |
| 2015/0022999 | A1 | 1/2015 | Yu et al. | |

* cited by examiner

LED LAMP COMPONENT HAVING REFLECTIVE/REFRACTIVE ELEMENT WITHIN TRANSLUCENT HOUSING

CROSS REFERENCE TO RELATED APPLICATIONS

The present application is the U.S. national stage application of international application PCT/EP2019/073646 filed Sep. 5, 2019, which international application was published on Mar. 26, 2020 as International Publication WO 2020/057985 A1. The international application claims priority to European Patent Application 18195636.8 filed Sep. 20, 2018 and Great Britain Application 1900959.6 filed Jan. 18, 2019.

FIELD OF THE INVENTION

The invention relates to a lamp component for forming a lamp having a large emission angle, in particular an elongate lamp. Further, the invention relates to a lamp comprising such a lamp component. Also, the invention relates to a manufacturing method for manufacturing such a lamp component.

BACKGROUND OF THE INVENTION

Known large-emitting lamps comprise several components that must be assembled in a plurality of manufacturing steps in order to assemble such lamps. For example, a known large-emitting lamp may comprise a LED light source, a lens, at least one reflector, a support and a housing.

However, the numerous components make the known lamps relatively complicated. Further, the different manufacturing steps make the known lamps relatively expensive.

SUMMARY OF THE INVENTION

The An object of the invention is therefore to provide an improved lamp component, which alleviates or reduces the afore-mentioned drawbacks. Accordingly, an object of the invention is a lamp component, for forming a lamp having a large emission angle of between 270 and 360 degrees so as to provide ambient light in a room, the lamp component having at least:

a source region configured to receive at least one LED light source, a light output surface configured to output light out of the lamp component, a light orienting element configured to receive light from the source region and to orient the received light towards the light output surface, and a housing configured to define the position of the light orienting element with respect to the source region, the housing having at least one housing sidewall configured to let light pass through it, wherein the light orienting element is configured i) to deflect a fraction of the light towards the light output surface so as to produce direct light, and ii) to refract a fraction of the light towards the at least one housing sidewall so as to produce indirect light, wherein the light orienting element is formed by a first extruded part extending in an extrusion direction, and wherein the housing is formed by a second extruded part extending in the extrusion direction.

Thus, such a lamp component allows to manufacture a lamp having a large emission angle (270-360°) while using fewer components than in known lamps. Indeed, the light orienting element of such a lamp component fulfils the functions of several parts of a known lamp, in particular the functions of the reflector and of the lens that had to be assembled in a known lamp. The lamp component may be sized at any desired length along the extrusion direction, the desired length depending on the intended use of the lamp.

According to an embodiment, the first extruded part and the second extruded part may be formed by a co-extruded part. According to an aspect, the co-extruded parts may be made either of the same material or of different materials. Thus, the light orienting element is integral with the housing, which enables an easy and cheap manufacturing method. Indeed, the first extruded part and the second extruded part are co-extruded, i.e., extruded simultaneously, e.g., through a common extruding machine.

According to an aspect, the light orienting element may include a reflector, which is advantageously a translucent reflector.

According to an embodiment, the light orienting element may have a reflection layer that is arranged to deflect a fraction of the light towards the light output surface, the reflection layer being either a layer of the first extruded part or a separate layer attached to the first extruded part. Thus, such a reflection layer helps reduce the light scattered in the room, hence reduce the values of UGR and of L65°. The UGR-value is the so-called "Unified Glare Rating", which is a measure of the discomfort glare, as defined in the applicable standard. The L65°-value is the measure of the luminance above a gamma angle of 65°, as defined in the applicable standard, e.g., 3000 cd/m$^2$ for office applications.

According to an embodiment, the light orienting element may be made of a light-diffusing material, which is advantageously selected in the group consisting of: a polycarbonate (PC), a polymethyl-methacrylate (PMMA) and a polyamide (PA), the light-diffusing material advantageously comprising a diffusing component. The diffusing component may for example be the component sold under the trademark Diffusor Pearl®.

Thus, the light orienting element may deflect a significant fraction of the incident light towards the light output surface while preventing this fraction of light from travelling past the light orienting element and further to the sides or top of the lamp component.

According to an embodiment, the light orienting element may be configured i) to deflect a major fraction of the light towards the light output surface, and ii) to refract a minor fraction of the light towards the at least one housing sidewall, such that the ratio of the direct light onto the indirect light ranges from 60/40 to 80/20, advantageously from 68/32 to 72/28.

Throughout the present application, a major fraction is more than 50% of the incident light. Conversely, a minor fraction is less than 50% of the incident light. Thus, such a light orienting element helps reduce the scattered light in the room, hence reduce the values of UGR and of L65°.

According to an aspect, the at least one housing sidewall may comprise elongate prisms that extend in the extrusion direction, the elongate prisms being advantageously located on an inner face of the housing.

Thus, the elongate prisms may deflect upwards or downwards the light rays that arrive onto the housing sidewall under a 0-degree angle with respect to the ceiling of the room. Further, the elongate prisms may prevent any person from directly viewing the LED light source.

Throughout the present application, the term "inner" or "inwards" qualify an element, for example a surface, that is oriented towards the source region. Conversely, the term "outer" or "outwards" qualify an element, for example a surface that is oriented away from the source region.

Advantageously, the elongate prisms may be one-piece with the extruded part that forms at least part of the housing.

According to an embodiment, the light orienting element may comprise two lateral portions arranged between the source region and the light output surface, the lateral portions being arranged to generally diverge from each other towards the light output surface. Thus, such lateral portions may fulfil the function of a lens as in the known lamps.

The lamp component may be free of any lens, and hence be relatively cheap and easy to manufacture.

According to an embodiment, at least one lateral portion may extend parallel to the extrusion direction, at least one lateral portion generally having a flat planar shape. Each lateral portion may have a thickness ranging from 1 mm to 4 mm.

According to an embodiment, wherein the light orienting element may further comprise a linking part, which is arranged to link the lateral portions with each other, the linking part being advantageously integral, and preferably one-piece, with the lateral portions.

Thus, such a linking part may increase the proportion of indirect light as it deflects a part of the light incident thereon, in particular via the portions of the linking part that connect to the lateral portions. Furthermore, such a linking part may enhance the uniformity of the light distribution in the room.

According to an embodiment, the linking part may generally have a flat rounded shape in cross section, the flat rounded shape being advantageously concave with respect to the source region. Thus, such a flat rounded shape may particularly increase the proportion of indirect light and enhance the uniformity of the light distribution in the room.

Alternatively, the linking part may generally have a flat planar shape.

According to an embodiment, the light orienting element may further comprise at least two upstream portions, the upstream portions extending in the extrusion direction and on both sides of the source region, each upstream portion having the general shape of a prism configured to deflect light away from the light output surface.

Thus, each upstream portion may deflect upwards or downwards the incident light rays that arrive onto the light orienting element under about a 0-degree angle with respect e.g., to the ceiling of the room. Thus, each upstream portion contributes to the production of indirect light and to the enhancement of the uniformity of the light distribution of the light coming from the side regions of the lamp.

According to an aspect, the upstream portions may be respectively connected or integral with the lateral portions.

According to an embodiment, the housing may further have a housing front wall, the housing front wall defining the light output surface, the housing front wall being one-piece with the at least one housing sidewall. Thus, such a housing may surround and protect the other parts of the lamp and of the lamp component, in particular the LED light source and the light orienting element.

According to an embodiment, the housing may be made of a transparent material, which is advantageously selected in the group consisting of: a polycarbonate (PC), a polymethyl-methacrylate (PMMA) and a polyamide (PA). Thus, such a housing may increase the proportion of direct light in the room, and the illuminance of the lamp.

Alternatively, the housing may be made of a light-diffusing or semitransparent material. The more the housing diffuses light, the higher the proportion of indirect light in the room.

According to an aspect, the housing may be white.

According to an aspect, the lamp component may further comprise an output device that is arranged between the light orienting element and the light output surface, and the output device may be configured to scatter light output from the lamp component. Advantageously, the output device may include a plate or sheet equipped with prisms configured for scattering incident light.

Besides, an object of the invention is a lamp, for example a luminaire, for providing ambient light in a room, the lamp comprising at least one lamp component as defined hereinbefore, the lamp further comprising at least one LED light source arranged in the source region such that the lamp has an emission angle of between 270 and 360 degrees. Thus, such a lamp alleviates or reduces the afore-mentioned drawbacks.

According to an aspect, the LED light source may be free from any lens.

Thus, such a lamp is relatively cheap and easy to manufacture.

Moreover, an object of the invention is a manufacturing method, for manufacturing a lamp component for forming a lamp having a large emission angle of between 270 and 360 degrees so as to provide ambient light in a room, wherein the manufacturing method comprises at least:

forming a light orienting element by extruding a first extruded part extending in an extrusion direction, the source region being configured to receive at least one LED light source, the light orienting element being configured: i) to receive light from a source region of the lamp component and ii) to orient the received light towards the light output surface, forming a housing by extruding a second extruded part extending in the extrusion direction, the first extruded part and the second extruded part being advantageously formed by a co-extruded part, the housing being configured to define the position of the light orienting element with respect to the source region, the housing having at least one housing sidewall configured to let light pass through it, and implementing a light output surface configured to output light out of the lamp component, implementing a light output surface configured to output light out of the lamp component, Thus, such a manufacturing method alleviates or reduces the afore-mentioned drawbacks.

According to another embodiment, light orienting element may comprise an upstream portion, a downstream portion and an intermediate portion, the intermediate portion being configured to connect the upstream portion to the downstream portion, a downstream face of the downstream portion having ribs or grooves advantageously extending in the extrusion direction so as to output light via site surface is of the several ribs or grooves, the width of the ribs increasing progressively as a function of the distance of the ribs to the source region. The intermediate portion may be curved, thus forming a curved portion.

When the lamp is in service, a downstream portion may be located closer to the room to be lit than an upstream portion. Conversely, an upstream portion may be located closer to the ceiling of the room to be lit and possibly closer to the light source.

Thus, such ribs or grooves may define a series of prisms that deflect light and output it out of the downstream face of the downstream portion. Since the ribs have an increasing width, the light can be evenly distributed over the downstream face of the downstream portion. The width of a rib may be measured along the downstream portion in a plane orthogonal to the extrusion direction. So, the lamp can have a flat design while emitting light with a large emission angle of 270-360 degrees.

According to an aspect, the width of the ribs may increase continuously as a function of the distance of the ribs to the source region.

Alternatively, the width of the ribs may increase stepwise as a function of the distance to the source region. For example, the ribs may be distributed into several groups each including several consecutive ribs of the same width, while the width generally increases as a function of the distance of the group to the source region. Each group may count e.g., two or three ribs or between 2 and 10 ribs.

According to an aspect, the light orienting element may be comprised of a light guide. Thus, the light rays may enter the light guide, then be reflected several times inside the light guide, i.e., on the interior periphery of the light guide, and be eventually conveyed through the light output surface.

According to an aspect, the intermediate portion may generally have a U-shaped cross-section.

According to an aspect, at least one of the upstream portions and the downstream portion may generally have a flat cross-section. Advantageously, the upstream portion has planar faces.

Throughout the present application, the terms "upstream" and "downstream" refer to a light path within the lamp component. For example, along a given light path, the light travels through an upstream portion before traveling through a downstream portion.

Throughout the present application, the term "cross-section" refers to the cross-section considered across the extrusion direction.

According to an aspect, the lamp component may further comprise a side mask, the side mask being opaque and extending at least partly between the intermediate portion and the housing sidewall, so as to prevent most of the light output from a connection region between the upstream portion and the intermediate portion from travelling to the housing sidewall.

According to an aspect, the housing may further comprise an upper wall, the upper wall being configured to prevent light from passing therethrough, the upper wall being advantageously configured to reflect most or all of the incident light.

According to an aspect, the lamp component may further comprise two source regions configured to receive respective LED light sources, the at least one light orienting element being arranged to receive light from both source regions and to orient the received light towards the light output surface.

According to an aspect, the lamp may be equipped with suspension cables, which enable suspending the lamp to e.g., a ceiling. Alternatively, the lamp may be configured to be fastened to or integrated in the ceiling or the walls of a room.

According to an aspect, the lamp may have a substantially linear and elongated shape. Alternatively, the lamp and the lamp component may have a curvy shape.

According to an aspect, the lamp component may have a generally rectangular, in particular square, cross-section across the extrusion direction. Alternatively, the lamp component may have a cross-section substantially in the form of a round outline e.g., a circle or an ellipse.

According to an aspect, the lamp component may have a double wall for the light to travel and pass through.

According to an aspect, the source region may include at least one, e.g., two, crosswise region that extends across the extrusion direction, e.g., perpendicularly, transversely or obliquely with respect to the extrusion direction. The at least one crosswise region may be located at a front end and/or at a rear end of the lamp component. The LED light source may be configured to receive an LED support, on which a plurality of LEDs may be supported so as to face a crosswise section of the light orienting element when the lamp is in an assembled state. Thus, the light emitted by the LEDs may enter the crosswise section of the light orienting element and from there travel inside the light orienting element.

According to an aspect, the housing upstream walls may be configured to let light pass through it. Alternatively, the housing upstream walls may be configured to block light.

According to an aspect, the lamp may comprise at least one cover arranged at the front and/or rear longitudinal end of the housing, the at least one cover being configured to surround a crosswise region. Thus, the cover may protect the LED light sources. The cover may be made out of aluminum or aluminum alloy. Thus, the covers can dissipate thermal energy to cool down the LEDs.

According to an aspect, the lamp component may comprise a holder configured to allow holding of the lamp component by a dedicated element, e.g., by suspension cables. The holder may be configured to be fastened to suspension holders that are secured to the suspension cables.

According to an aspect, the holder may extend along part or all of the length of the lamp component in the extrusion direction. The holder may be an extruded part. The holder may be integral, in particular one-piece, with the light orienting element and/or the housing (co-extruded parts).

According to an aspect, the holder may define a longitudinal channel or groove for receiving the suspension holders. The holder may be partly located in a space surrounded by the light orienting element. Thus, the holder and/or the suspension holders may protrude only slightly out of the housing.

According to an aspect, the holder may be made out of a mechanically optimized material, e.g., aluminum or aluminum alloy, whereas the light orienting element and/or the housing may be made out of optically optimized plastics. Thus, the holder may offer a large mechanical resistance, say stiffness.

According to an aspect, the housing may be composed of different, separate walls, e.g., a housing front wall, housing sidewalls and housing upstream walls.

According to an aspect, the lamp component may further include struts extending between the housing and the light orienting element so as to mutually support and hold them and to stiffen the overall structure of the lamp component. Each strut may extend obliquely with respect to the extrusion direction. According to an aspect, each strut may span the gap between the housing and the light orienting element.

According to an aspect, the lamp component may further include at least one light diffusing sheet. Light diffusing sheet may be arranged above, e.g., on top of, the housing front wall, so as to help in diffusing the light before it is emitted by the light output surface. According to an aspect, lenses and/or reflectors may be located in the gap between the light orienting element and the housing.

According to an aspect, the lamp component may include an outer sheet, which is made of a thin layer of a transparent or translucent material, and which covers part or all of the outer surface of the housing. Thus, the outer sheet may help in outputting a uniform light.

According to an aspect, the housing and the light orienting element may be comprised of several, e.g., five, different elements or sections with respective optical properties.

According to an aspect, the housing front wall may be totally or partially transparent and the housing sidewalls may be configured to be totally or partially translucent, e.g., white. Alternatively, the housing sidewalls may be configured to be totally or partially i) transparent, ii) light scattering or iii) light deviating, while the housing front wall may be configured to be totally or partially transparent. Further, the housing upstream walls may be configured to be totally or partially i) light scattering or ii) light diffusing.

According to an aspect, the light orienting element may be hollow and tubular. Alternatively, the light orienting element may be substantially flat, instead of being substantially hollow, tubular.

The invention is further explained in the following detailed description based on exemplary embodiments and referring to the exemplary drawings in which:

DETAILED DESCRIPTION

Exemplary embodiments will now be described with reference to the exemplary drawings, in which like reference signs refer to like parts or features. The described embodiments, aspects and drawings shall not be used to limit the scope or construction of the appended claims.

Figure 1:
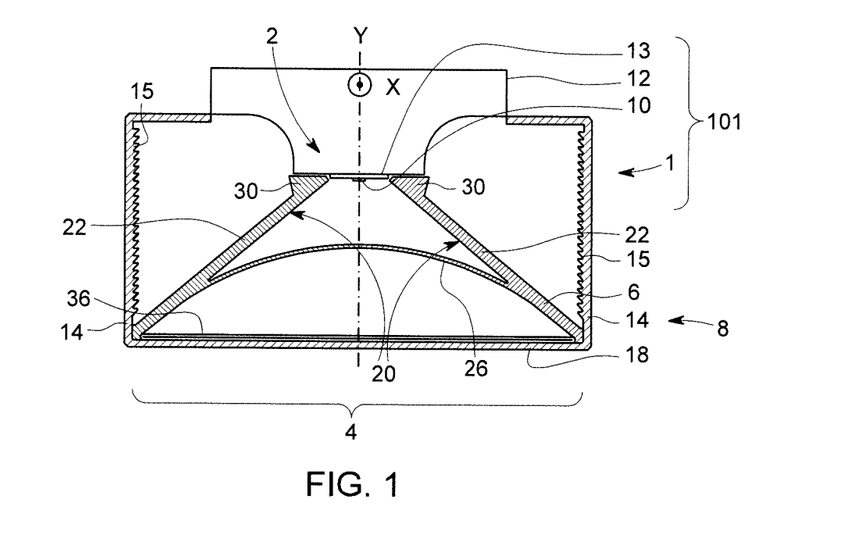
FIG. 1 is a schematic cross-section of a lamp including a lamp component according to a first embodiment.
Figure 2:
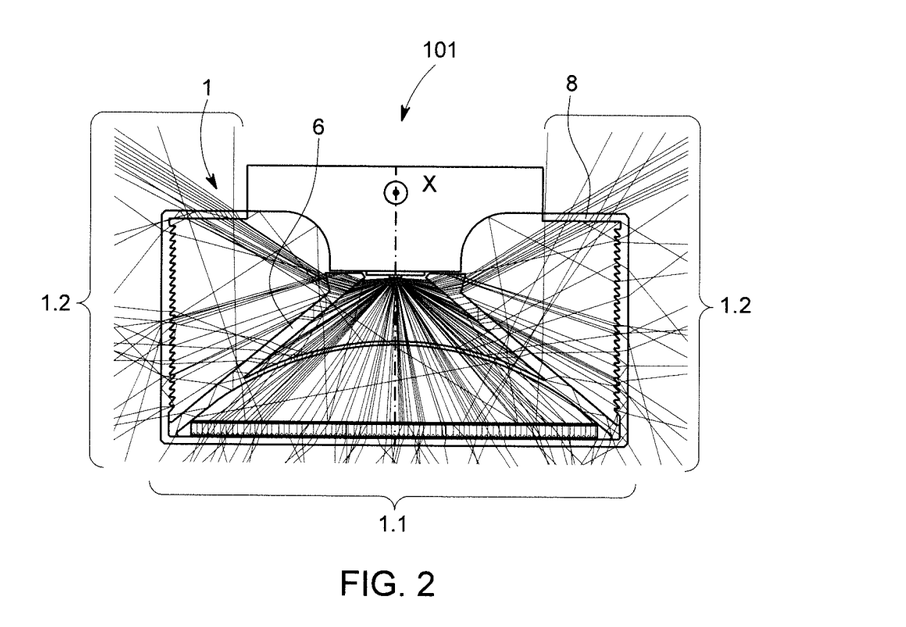
FIG. 2 is a schematic cross-section of the lamp of FIG. 1 illustrating various light paths when the LED light source emits light.

FIGS. 1 and 2 depict a lamp component 1 for forming a lamp 101 which has a large emission angle of about 270 degrees so as to provide ambient light in a room. Lamp component 1 has a source region 2, a light output surface 4, a light orienting element 6 and a housing 8.

Source region 2 is configured to receive a LED light source 10. Source region 2 receives a LED support 12, which supports LED light source 10. LED support 12 may be an extruded part. LED support 12 may include a supporting plate 13. LED light source 10 may be arranged in source region 2 such that lamp 101 has a large emission angle of about 270 degrees.

Light output surface 4 is configured to output light out of lamp component 1. When lamp 101 is installed for example on a non-illustrated ceiling of a room, light output surface 4 may be the lowest surface of lamp component 1. Lamp 101 may further include a non-illustrated fastening member configured to fasten the lamp to the ceiling of the room.

As illustrated on FIG. 2, when lamp component 1 and lamp 101 are in operation, the light exiting from lamp 101 may illuminate a non-illustrated room. All the lines that are present on FIG. 2 but not on FIG. 1 represent various light paths from a computational simulation of a state where lamp 101 is in service and LED light source 10 is switched on.

Light orienting element 6 is configured to receive light from source region 2, hence from LED light source 10 when lamp component 1 is assembled into lamp 101. Further, light orienting element 6 is configured to orient the received light within lamp component 1 and towards the light output surface 4, as will be hereafter detailed in relation to FIG. 2. Light orienting element 6 is herein comprised of a translucent reflector.

Housing 8 is configured to define the position of light orienting element 6 with respect to source region 2. Housing 8 helps to properly position light orienting element 6 with respect to source region 2. In the example of FIGS. 1 and 2, housing 8 has two housing sidewalls 14, which are configured to let incident light pass through them.

Further, housing 8 has a housing front wall 18. Housing front wall 18 defines light output surface 4. Housing front wall 18 is herein one-piece with both housing sidewalls 14. Light orienting element 6 is located inside housing 8. Housing 8 also surrounds, hence protects, the other parts of lamp 101 or lamp component 101, in particular LED light source 10 and light orienting element 6.

Light orienting element 6 is configured to deflect a fraction, e.g., a major fraction, i.e., more than 50%, of the light received from source region 2 towards light output surface 4 so as to produce direct light 1.1. Further, light orienting element 6 is configured to refract a fraction, e.g., a minor fraction, i.e., less than 50%, of the light received from source region 2 towards both housing sidewalls 14 so as to produce indirect light 1.2.

For example, the ratio of the direct light onto the indirect light may be about 70/30. On FIG. 2, direct light is represented by light rays 1.1, whereas indirect light is represented by light rays 1.2. Direct light is the sum of the light rays that fall upon the target to be lit, say the floor of the room, without being previously reflected or diffracted by another surface in the room, say the ceiling or a wall. Conversely, indirect light is the sum of the light rays that reach the target to be lit only after having been reflected or diffracted at least once by another surface in the room.

Light orienting element 6 is formed by a first extruded part, which extends in an extrusion direction X. Likewise, housing 8 is formed by a second extruded part, which extends in extrusion direction X. In the example of FIGS. 1 and 2, the first extruded part and the second extruded part, respectively light orienting element 6 and housing 8, are formed by a co-extruded part, which extends in extrusion direction X. Thus, light orienting element 6 may be made integral with housing 8 without requiring any joining means. Being formed by respective first and second extruded parts, light orienting element 6 and housing 8 are not formed by molded parts. So, light orienting element 6 and housing 8 may be free of any usual molding mark, for example a plane joint or a mold seam.

Lamp component 1 and lamp 101 are symmetric about a plane defined by extrusion direction X and by a symmetry direction Y that is orthogonal to extrusion direction X. Accordingly, source region 2, light output surface 4, light orienting element 6, housing 8, LED light source 10 and LED support 12 are also symmetric about plane X-Y. Lamp component 1 may be sized at any desired length along extrusion direction X, the desired length depending on the intended use of lamp 101.

Housing sidewalls 14 respectively comprise elongate prisms 15 that extend in extrusion direction X. Elongate prisms 15 are located on a respective inner face of housing sidewalls 14, hence of housing 8. Elongate prisms 15 are one-piece with the extruded part that forms housing 8.

Elongate prisms 15 may help deflecting upwards or downwards the flat light rays that arrive onto housing sidewalls 14 under a 0-degree angle with respect to the ceiling of the room.

Light orienting element 6 and housing 8 are made of two different materials. Light orienting element 6 may be made of a light-diffusing material, for example of polycarbonate (PC), a polymethyl-methacrylate (PMMA) and a polyamide (PA), the light-diffusing material may advantageously comprise a diffusing component. The diffusing component may for example be the component sold under the trademark Diffusor Pearl®. Light orienting element 6 may deflect a significant fraction of the incident light towards light output surface 4. Housing 8 may be transparent and made for example of PMMA.

Light orienting element 6 fulfils the function of a translucent reflector. Light orienting element 6 further has a reflection layer 20 that is arranged to deflect a fraction of the light towards the light output surface 4, as illustrated in particular in FIG. 2. Reflection layer 20 is a layer of the first extruded part, i.e., of light orienting element 6. As reflection layer 20 helps reduce the light scattered in the room, thus enhancing the UGR value and a L65°-value of lamp 101.

Light orienting element 6 comprises two lateral portions 22, which are arranged between source region 2 and light output surface 4. Lateral portions 22 are arranged to generally diverge from each other towards light output surface 4. Lateral portions 22 extend parallel to extrusion direction X. Each one of lateral portions 22 has a flat, planar shape, thus forming a lateral wall of light orienting element 6. Each one of lateral portions 22 may have a thickness ranging from 1 mm to 4 mm.

Light orienting element 6 further comprises a linking part 26, which is arranged to link lateral portions 22 to each other. Linking part 26 is one-piece with lateral portions 22. Linking part 26 generally has a flat rounded shape that is concave with respect to source region 2, i.e., that is bulging towards source region 2.

Linking part 26 helps to increase the proportion of indirect light as it deflects a part of the incident light, in particular via the portions of linking part 26 that connect to lateral portions 22, as illustrated on FIG. 2. Linking part 26 helps enhance the uniformity of the light distribution in the room.

Further, light orienting element 6 comprises two upstream portions 30. Upstream portions 30 extend in extrusion direction X and on both sides of source region 2. Each upstream portion 30 has the general shape of a prism, which is configured to deflect light away from light output surface 4, as illustrated on FIG. 2. Upstream portions 30 are respectively one-piece with lateral portions 22.

Each upstream portion 30 may help deflect upwards or downwards the incident light rays that arrive onto light orienting element 6 under about a 0-degree angle with respect e.g., to the ceiling of the room. Such 0-degree or flat light rays are for example represented on FIG. 2 by the uppermost light lines emitted by LED light source 10.

Each upstream portion 30 contributes to the production of indirect light and to the enhancement of the uniformity of the light distribution of the light coming from the side regions of lamp 101 (right and left-hand sides on FIGS. 1 and 2).

Besides, lamp component 1 further comprises an output device 36 that is arranged between light orienting element 6 and light output surface 4. Output device 36 is configured to scatter light exiting from lamp component 1. Output device 36 includes a plate equipped with prisms configured for scattering incident light.

Figure 3:
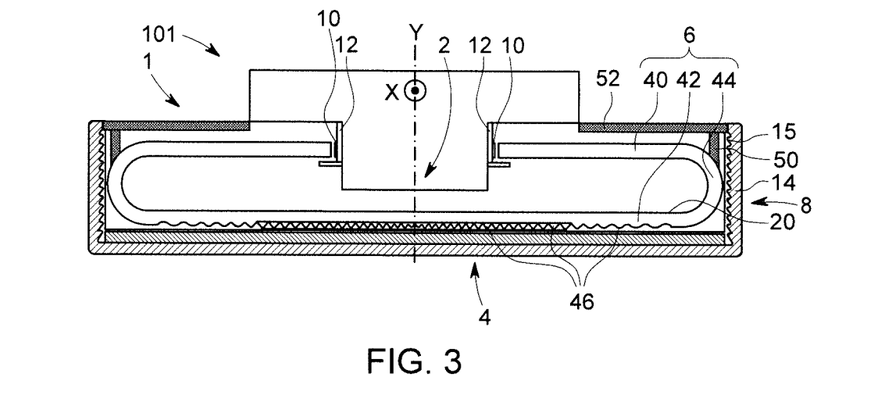
FIG. 3 is a schematic cross-section of a lamp including a lamp component according to a second embodiment.
Figure 4:
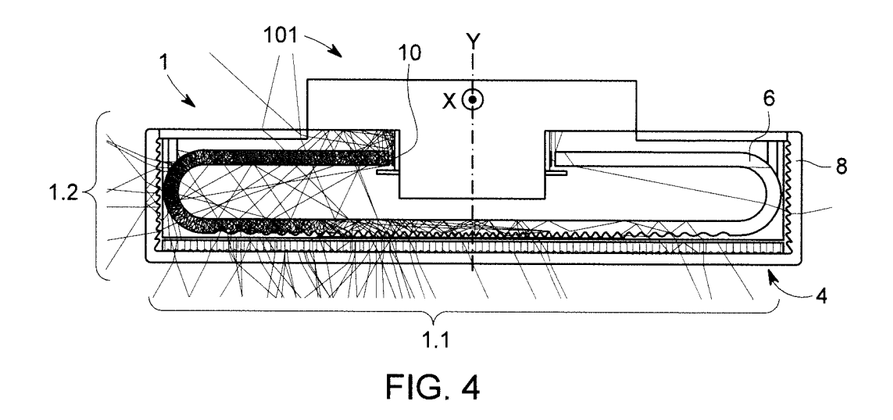
FIG. 4 is a schematic cross-section of the lamp of FIG. 3 illustrating various light paths when the LED light source emits light.

FIGS. 3 and 4 illustrate a second embodiment of a lamp component 1 and of a lamp 101. Inasmuch as lamp component 1 and lamp 101 of FIGS. 3 and 4 are respectively similar to lamp component 1 and lamp 101 of FIGS. 1 and 2, the afore-detailed description may be applied to lamp component 1 and lamp 101 of FIGS. 3 and 4, but for the hereinafter-mentioned noticeable differences. An element of lamp component 1 and lamp 101 of FIGS. 3 and 4 having a structure or function identical or similar to an element of lamp component 1 and lamp 101 of FIGS. 1 and 2 is given the same reference sign.

As illustrated on FIG. 4, when lamp component 1 and lamp 101 are in operation, the light output from lamp 101 may emit light towards a non-illustrated room. All the lines that are present on FIG. 4 but not on FIG. 3 represent various light paths from a computational simulation of a state where lamp 101 is in service and switched on.

Like lamp component 1 of FIGS. 1 and 2, lamp component 1 of FIGS. 3 and 4 may comprise a source region 2, a light output surface 4, a housing 8 with housing sidewalls 14 and elongate prisms 15. Like lamp component 1 and lamp 51 of FIGS. 1 and 2, lamp component 1 and lamp 51 of FIGS. 3 and 4 are symmetric about a plane X-Y defined by extrusion direction X and by a symmetry direction Y that is orthogonal to extrusion direction X. Like in lamp component 1 of FIGS. 1 and 2, light orienting element 6 of FIGS. 3 and 4 is configured to produce direct light 1.1 and indirect light 1.2.

Lamp 101 of FIGS. 3 and 4 differs from lamp 101 of FIGS. 1 and 2 in that lamp 101 of FIGS. 3 and 4 comprises two LED light sources 10. LED light sources 10 are mounted on respective LED supports 12. Accordingly, lamp component 1 comprises two source regions 2, which are configured to receive respective LED light sources 10. Light orienting element 6 is arranged to receive light from both source regions 2 and to orient the received light within lamp component 1 and towards the light output surface 4.

Lamp 101 of FIGS. 3 and 4 further differs from lamp 101 of FIGS. 1 and 2 in that the light orienting element 6 of FIGS. 3 and 4 is herein comprised of a light guide. The light rays may thus enter the light guide, then be reflected several times inside the light guide, and be eventually conveyed through the light output surface 4.

On FIG. 2, only one of LED light sources 10 is switched on (left-hand side). However, both LED light sources 10 may be switched on simultaneously. In an alternative embodiment, lamp 101 may comprise only one LED light source 10, in which case lamp 101 is not symmetric.

Lamp component 1 of FIGS. 3 and 4 further differs from lamp component 1 of FIGS. 1 and 2 in that lamp component 1 of FIGS. 3 and 4 comprises a light orienting element 6 that is shaped differently from light orienting element 6 of FIGS. 1 and 2. Indeed, light orienting element 6 comprises an upstream portion 40, a downstream portion 42 and an intermediate portion 44. Intermediate portion 44 is herein curved, thus forming a curved portion.

Intermediate portion 44 is configured to connect upstream portion 40 to downstream portion 42. Intermediate portion 44 generally has a U-shaped cross-section. Upstream portion 40 and downstream portion 42 generally have a flat cross-section. Upstream portion 40 has planar faces.

A downstream face of downstream portion 42 is ripples in order to output light via several ribs or grooves 46. The width of the ribs 46 increases progressively as a function of the distance of the ribs 46 to source region 2, herein also to symmetry direction Y. In the example of FIGS. 3 and 4, the width of the ribs increases continuously, i.e., at each new rib, as a function of the distance of the rib to source region 2.

The ribs 46 define a series of prisms that deflect light and output it out of downstream face of the downstream portion 44. Since ribs 46 have an increasing width, the light can be evenly distributed over the downstream face of downstream portion 44. The width of a rib 46 may be measured along downstream portion 44 in a plane orthogonal to the extrusion direction X (e.g., plane of FIG. 3). Lamp 101 has a flat design while emitting light with a large emission angle of 270-360 degrees.

Besides, lamp component 1 of FIGS. 3 and 4 differs from lamp component 1 of FIGS. 1 and 2 in that reflection layer 20 is separate from and attached to light orienting element 6, in particular to downstream portion 42. Reflection layer 20 may be formed by a sheet having reflecting properties.

Lamp component 1 of FIGS. 3 and 4 differs from lamp component 1 of FIGS. 1 and 2 in that lamp component 1 of FIGS. 3 and 4 further comprises a side mask 50. Side mask 50 is opaque and extends between intermediate portion 44 and housing sidewall 14 in order to prevent most of the light output from a connection region between upstream portion 40 and intermediate portion 44 from travelling to housing sidewall 14.

Further, lamp component 1 of FIGS. 3 and 4 differs from lamp component 1 of FIGS. 1 and 2 in that housing 8 comprises an upper wall 52, which is separate from the adjacent housing sidewall 14, and which is configured to reflect most or all of the incident light. Upper wall 52 is configured to prevent light from passing therethrough. Only a few light rays pass upper walls 52 on FIG. 4, whereas much more light rays pass the upper walls of housing 8 on FIG. 2.

As represented on FIG. 4, a large fraction of light emitted by LED light source 10 is conveyed downstream the light orienting element 6 and then output through light output surface 4, thus producing direct light. Part of the light emitted by LED light source 10 is refracted in light orienting element 6 and exits from lamp component 1 via housing sidewalls 14, thus producing indirect light.

Figure 5:
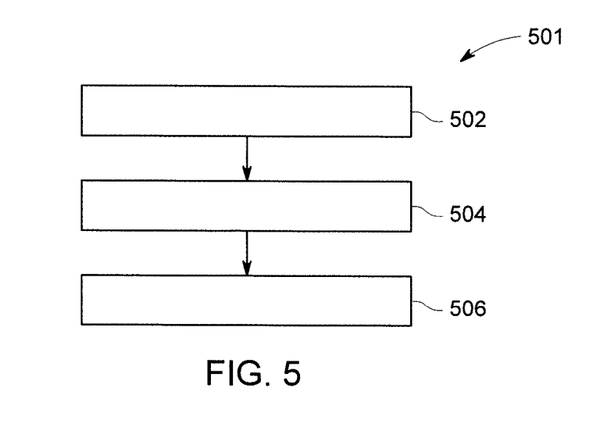
FIG. 5 is a sequence diagram illustrating a manufacturing method for manufacturing a lamp component according to an embodiment.

FIG. 5 represents a manufacturing method 501 according to an embodiment, for manufacturing lamp component 1 for forming lamp 101. The manufacturing method 501 comprises at least:

box 502: forming light orienting element 6 by extruding a first extruded part extending in extrusion direction X, light orienting element 6 being configured: i) to receive light from source region 2 of lamp component 1 and ii) to orient the received light within lamp component 1 and towards the light output surface 4, source region 2 being configured to receive one or more LED light source(s) 10.

box 504: forming housing 8 by extruding a second extruded part extending in extrusion direction X, the first extruded part and the second extruded part being advantageously formed by a co-extruded part, housing 8 being configured to define the position of light orienting element 6 with respect to source region 2, housing 8 having at least one housing sidewall 14 configured to let light pass through it, and box 506: implementing light output surface 4 configured to output light out of the lamp component 1, light orienting element 6 being further configured i) to deflect a fraction of the light towards light output surface 4 so as to produce direct light, and ii) to refract a fraction of the light towards the at least one housing sidewall 14 so as to produce indirect light.

Lamp component 1 may be manufactured to be sized at any desired length along extrusion direction X, the desired length depending on the intended use of lamp 101.

FIGS. 6 to 11 illustrate a third embodiment of a lamp component 1 and of a lamp 51. Inasmuch as lamp component 1 and lamp 51 of FIGS. 6 to 11 are respectively similar to lamp component 1 and lamp 51 of FIGS. 3 and 4, the afore-detailed description may be applied to lamp component 1 and lamp 51 of FIGS. 6 to 11, but for the hereinafter-mentioned noticeable differences. An element of lamp component 1 and lamp 51 of FIGS. 6 to 11 having a structure or function identical or similar to an element of lamp component 1 and lamp 51 of FIGS. 3 and 4 is given the same reference sign.

Figures 6, 7, 8, 9, 10:
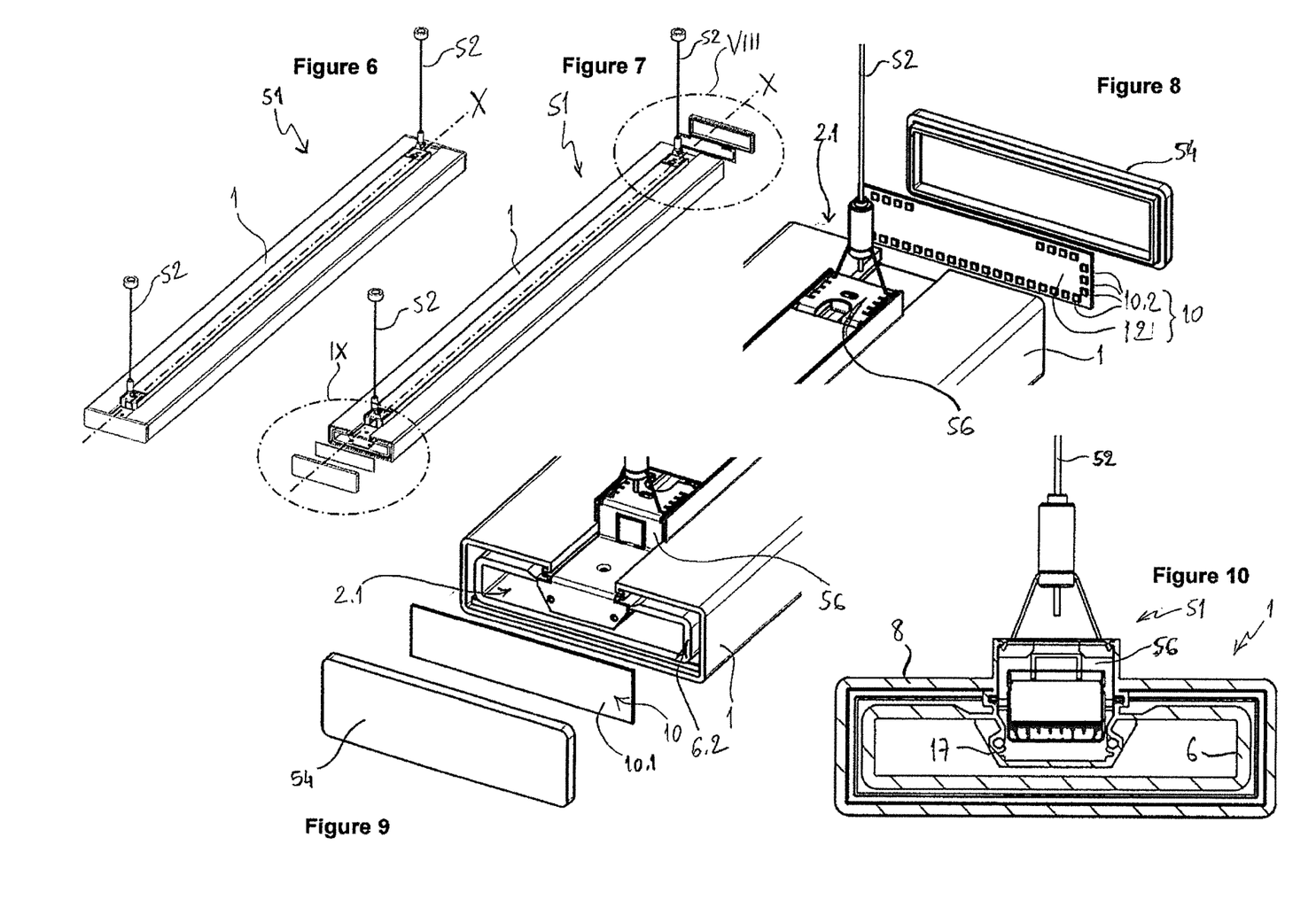
FIG. 6 is a schematic perspective view of a lamp including a lamp component according to a third embodiment.
FIG. 7 is a schematic partially exploded perspective view of the lamp of FIG. 6.
FIG. 8 is an enlarged view of detail VIII in FIG. 7.
FIG. 9 is an enlarged view of detail IX in FIG. 7.
FIG. 10 is a schematic cross-section of the lamp of FIG. 6 in a plane perpendicular to extrusion direction X.
Figure 11:
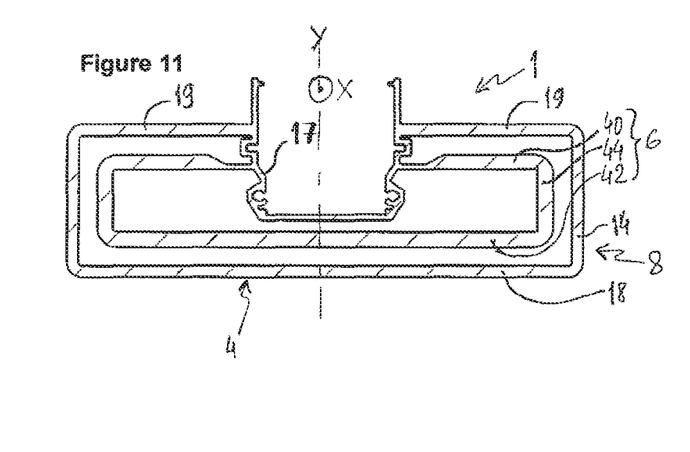
FIG. 11 is a schematic cross-section of the lamp component of the lamp of FIG. 10.

For example, as visible in FIG. 11, lamp component 1 includes a source region 2, a light output surface 4, a light orienting element 6, and a housing 8 having housing sidewalls 14. Further, as visible in FIG. 10, lamp 101 includes a LED light source 10. As depicted in FIGS. 6 and 7, lamp 101 is equipped with suspension cables 52, which enable suspending lamp 51 to e.g., a ceiling. Alternatively, a lamp according to the invention may be fastened to or integrated in the ceiling or the walls of a room.

Like lamp component 1 of FIGS. 3 and 4, lamp component 1 of FIGS. 6 to 11 extends in extrusion direction X. Thus, lamp 101 has a substantially linear and elongated shape. Alternatively, the lamp and lamp component according to the invention may have a curvy shape instead of a linear shape.

Across extrusion direction X lamp component 1 has a rectangular cross-section. In the example of FIGS. 3 and 4, light orienting element 6 and housing 8 both have a rectangular cross-section, whereby lamp component 1 has a double wall for the light to travel and pass through. Alternatively, a lamp component according to the invention may have a cross-section substantially in the form of a square or of a round outline e.g., circle or ellipse.

Like light orienting element 6 of FIGS. 3 and 4, light orienting element 6 of FIG. 11 comprises an upstream portion 40, a downstream portion 42 and an intermediate portion 44. Unlike the curved intermediate portion 44 of FIGS. 3 and 4, intermediate portion 44 of FIG. 11 has a substantially straight, planar shape. Each intermediate portion 44 of FIG. 11 may be connected respectively to the upstream portion 40 and to the downstream portion 42 by portions being more or less curved, i.e., portions having a radius of curvature that may be more or less large. Like light orienting element 6 of FIGS. 3 and 4, light orienting element 6 of FIG. 11 may be comprised of a light guide.

Like housing 8 of FIGS. 3 and 4, housing 8 of FIG. 11 has sidewalls 14 and a housing downstream or front wall 18, which defines the light output surface 4 and which is one-piece with both housing sidewalls 14. Further, housing 8 accommodates, hence protects, light orienting element 6.

Like light orienting element 6 of FIGS. 3 and 4, light orienting element 6 of FIG. 11 is configured i) to deflect a fraction of the light towards light output surface 4 so as to produce direct light, and ii) to refract a fraction of the light towards the housing sidewalls 14 so as to produce indirect light.

Like in the lamp component 1 of FIGS. 3 and 4, light orienting element 6 and housing 8 are formed respectively by a first and a second extruded parts extending in extrusion direction X. Thus, light orienting element 6 and the housing 8 form profiles extruded in extrusion direction X. Also, the lamp composed of such a lamp component can be manufactured and assembled more quickly and easily since it does not require additional fastening or connecting elements, like screws. Thus, the cost of such lamps may be less expensive, while they may have a longer service life.

In the example of FIGS. 3 and 4, light orienting element 6 and housing 8 are co-extruded parts. The co-extruded light orienting element 6 and housing 8 may be made either of the same material or of different materials. For example, the light orienting element may be made of a self-light diffusing material, while the housing may be made of transparent or light scattering material.

Lamp component 1 of FIGS. 6 to 11 differs from lamp component 1 of FIGS. 3 and 4 in that source region 2 includes two crosswise regions 2.1 that extend across extrusion direction X, e.g., perpendicularly, transversely or obliquely with respect to extrusion direction X. In particular, crosswise regions 2.1 are located respectively at a front end and at a rear end of lamp component 1. By contrast, source region 2 in FIGS. 3 and 4 is located opposite output surface 4 with respect to light orienting element 6, so as to extend along extrusion direction X. For example, source region 2 in FIGS. 3 and 4 may include a plurality of LEDs distributed longitudinally in extrusion direction X, wherein each LED may be arranged like the ones illustrated in FIGS. 3 and 4.

Figure 14:
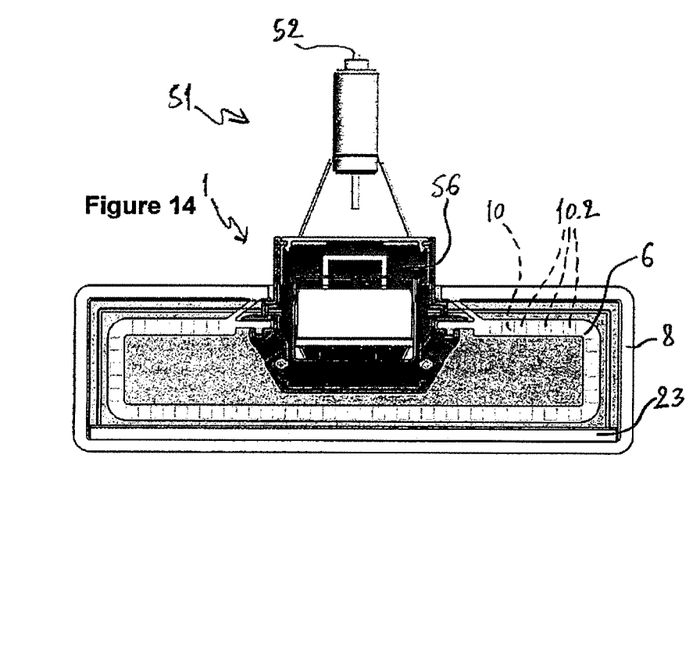
FIG. 14 is a view similar to FIG. 10 of a lamp including a lamp component according to a sixth embodiment.
Figure 15:
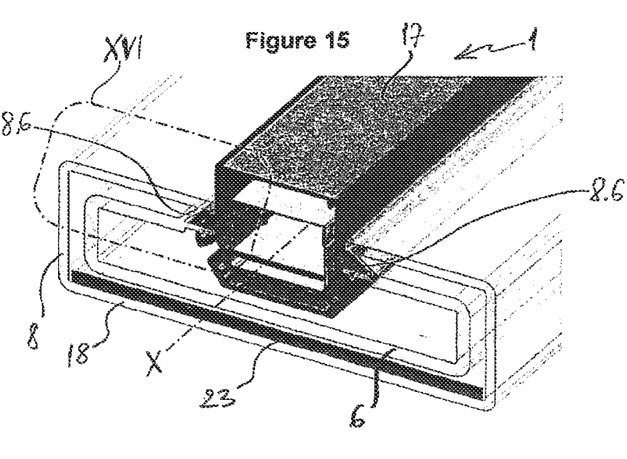
FIG. 15 is a schematic perspective view of the lamp of FIG. 13.

In the example of FIGS. 6 to 11, at both crosswise regions 2.1, an LED light source 10 is configured to receive an LED support 12, on which a plurality of LEDs 10.2 may be supported so as to face a crosswise section 6.2 of light orienting element 6 when lamp 51 is in an assembled state. For example, FIG. 14 depicts an LED light source 10 facing a crosswise section of light orienting element 6. Thus, light emitted by LEDs 10.2 may enter crosswise section 6.2 and from there travel inside light orienting element 6. In particular, LEDs 10.2 arranged on a rectangle pattern which corresponds to a rectangle shape of crosswise section 6.2.

When lamp 51 of FIGS. 6 to 11 is in service, the light emitted by LEDs 10.2 first travels substantially longitudinally along extrusion direction X before getting partially deflected or partially reflected by light orienting element 6. By contrast, when lamp 51 of FIGS. 3 and 4 is in service the light admitted by LED light source 10 first travels substantially across extrusion direction X, that is transversely and/or perpendicularly to extrusion direction X.

As a result of LEDs 10.2 facing crosswise section 6.2, the number of LEDs required to spread light throughout lamp component 1 may be reduced with respect to embodiments like the ones illustrated in FIGS. 1 to 4. Thus, lamp 51 of FIGS. 6 to 11 might need fewer LEDs than lamp 51 of FIGS. 3 and 4 depending on the ratio of the length in extrusion direction X over the width or the height of lamp component 1. In the example of FIGS. 6 and 7, the length of lamp component 1 is much larger than its width or its height.

According to a non-illustrated embodiment, the lamp component may have a source region including only one crosswise region that extends across the extrusion direction. The lamp including such a lamp component may comprise only one LED light source that is mounted so as to face the crosswise section.

Furthermore, lights component 1 of FIGS. 6 to 11 differs from like component 1 of FIGS. 3 and 4 in that, similar to lamp component 1 of FIGS. 1 and 2, housing upper or upstream walls 19 of FIG. 11 are configured to let light pass through it, whereas upper walls 52 in the example of FIG. 3 are configured to block light.

Besides, lamp 51 of FIGS. 6 to 10 comprises two covers 54. Covers 54 are arranged respectively at the front and rear longitudinal ends of housing 8. Covers 54 may be configured to surround crosswise regions 2.1. Thus, covers 54 may protect LED light sources 10. Such covers may also be included in the lamps 1 of FIGS. 1 to 4. Covers 54 may be made out of aluminum or aluminum alloy. Thus, covers 54 can dissipate thermal energy to cool down LEDs 10.2 and/or some electric components supplying power to LEDs 10.2. Lamp 51 may further comprise non-illustrated seals configured to seal the interior of lamp component 1.

As visible in particular in FIG. 11, lamp component 1 may comprise a holder 17, which is configured to allow holding of lamp component 1 by a dedicated element, e.g., by the suspension cables 52 in the example of FIGS. 6 to 11. Holder 17 is configured to be fastened to suspension holders 56 that are secured to suspension cables 52.

Holder 17 may extend along part or all of the length of lamp component 1 in extrusion direction X. Holder 17 may be an extruded part. In the example of FIGS. 10 and 11, holder 17 is integral, in particular one-piece, with light orienting element 6 and housing 8. In other words, light orienting element 6, housing 8 and holder 17 are co-extruded parts.

Holder 17 may define a longitudinal channel or groove for receiving suspension holders 56. Holder 17 may be partly located in the space surrounded by light orienting element 6. Thus, holder 17 and/or suspension holders 56 may protrude only slightly out of housing 8, which helps in making lamp 51 compact.

Lamp 1 may further include an electric circuit configured to supply power to LED light source 10. The electric circuit may comprise two parallel portions in order to supply power independently to LED light sources 10. Suspension cables 52 may accommodate an electric cable so as to electrically connect the electric circuit to the mains. Part of the electric circuit may be received in the longitudinal channel or groove defined by holder 17.

Depending on the function they fulfill, i.e., on the way they influence light when the lamp is in service, the elements of the lamp component may be classified as:

a first element formed by the housing front wall and emitting light downward;

a second element formed by the housing sidewalls and emitting light sideward or laterally;

a third element formed by the housing upstream walls and emitting light upwards;

a fourth element formed by the holder and allowing holding of lamp component 1 by a dedicated element; and a fifth element formed by the light orienting element and deflecting and/or refracting, hence distributing, light within the lamp component.

Figure 12:
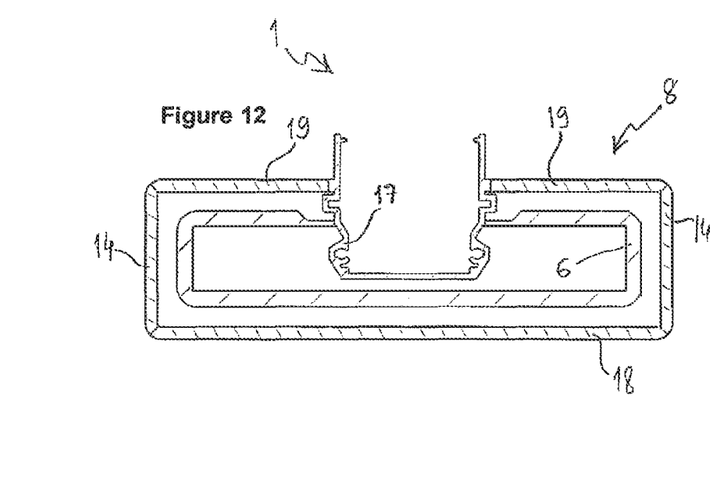
FIG. 12 is a view similar to FIG. 11 of a lamp component according to a fourth embodiment.
Figure 13:
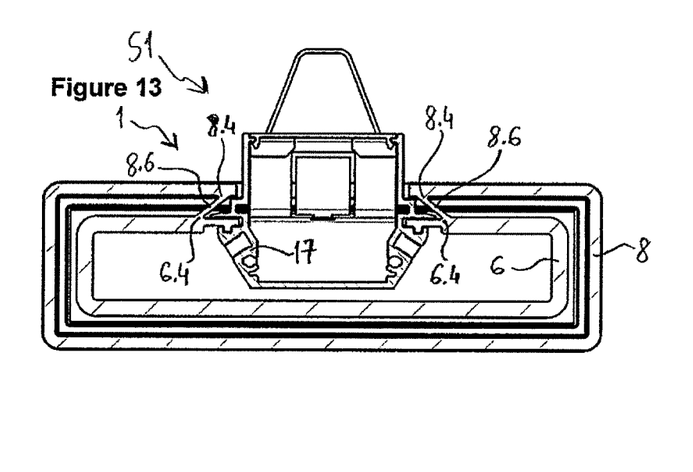
FIG. 13 is a view similar to FIG. 11 of a lamp component according to a fifth embodiment.

FIG. 12 illustrates a fourth embodiment of a lamp component 1, which is similar to the embodiment illustrated in FIG. 11, and in which elements having similar or identical structure or function as in FIG. 11 are given the same reference signs.

Lamp component 1 of FIG. 12 differs from lamp component 1 of FIG. 11 in that holder 17 of FIG. 12 on the one hand, and light orienting element 6 and/or housing 8 of FIG. 12 on the other hand, are made of different pieces, whereas these elements are one-piece in the example of FIG. 11. In other words, holder 17 is distinct from, hence not one-piece with, light orienting element 6 or with housing 8. Thus, holder 17 may be made out of a material that is different from light orienting element 6 and/or housing 8. In FIG. 12, the limits of holder 17, housing 8 and light orienting element 6 are made apparent by solid lines and by hatchings of different orientations.

For example, holder 17 may be made out of a mechanically optimized material, e.g., aluminum or aluminum alloy, whereas light orienting element and/or housing 8 may be made out of optically optimized plastics as detailed hereinbefore. In this example, a method of manufacturing lamp component 1 may include a step of inserting aluminum holder 17 within the extruded light orienting element 6 and housing 8. Thus, holder 17 may offer a larger mechanical resistance, say stiffness, than holder 17 of FIG. 11.

Furthermore, lamp component 1 of FIG. 12 differs from lamp component 1 of FIG. 11 in that housing 8 is composed of different, separate walls, namely housing front wall 18, housing sidewalls 14 and housing upstream walls 19. On FIG. 12 the limits of housing front wall 18, housing sidewalls 14 and housing upstream walls 19 are made apparent by solid lines and by hatchings of different orientations. In a method of manufacturing lamp component 1 of FIG. 12 these four different parts may be extruded parts, e.g., co-extruded parts.

FIGS. 13 to 16 illustrate a lamp component 1 and a part of a lamp 51 according to a fifth embodiment, which is similar to the embodiment illustrated in FIG. 12, and in which elements having similar or identical structure or function as in FIG. 12 are given the same reference signs.

Lamp component 1 of FIGS. 13 to 16 differs from lamp component 1 of FIG. 12 in that lamp component 1 of FIGS. 13 to 16 further includes struts 8.6. Struts 8.6 extend between housing 8 and light orienting element 6 so as to mutually support and hold them and to stiffen the overall structure of lamp component 1 of FIGS. 13 to 16. Each strut 8.6 is arranged to link inward, holder-oriented ends 8.4 of housing 8 to inward, holder-oriented ends 6.4 of light orienting element 6. In the example of FIGS. 13 to 16, each strut 8.6 extends obliquely with respect to extrusion direction X, while both struts 8.6 taper together towards an upper region of holder 17. Thus, the oblique extension of struts 8.6 helps in transmitting mechanical forces in several directions.

Lamp component 1 of FIGS. 13 to 16 further differs from lamp component 1 of FIG. 12 in that, like in housing 8 of FIG. 11, housing 8 of FIGS. 13 to 16 is made one-piece. In other words, housing front wall 18, housing sidewalls 14 and housing upstream walls 19 are one-piece and not different, separate walls.

In addition, lamp component 1 of FIGS. 13 to 16 may further include a light diffusing sheet 23. Light diffusing sheet 23 may be arranged above, e.g., on top of, housing front wall 18, so as to help in diffusing light before it is emitted by light output surface 4. Such a light diffusing sheet may also be included in other embodiments, like the one illustrated in FIGS. 3 and 4 or in FIG. 9.

Figure 16:
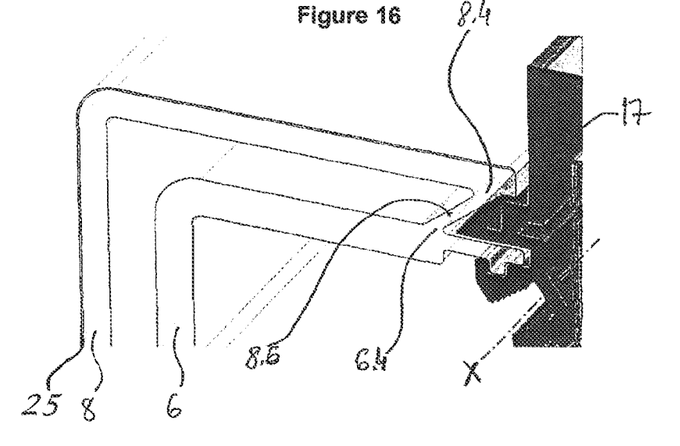
FIG. 16 is an enlarged view of detail XVI in FIG. 15.

Further, as visible in FIG. 16, lamp component 1 may include an outer sheet 25, which is made of a thin layer of a transparent or translucent material, and which covers part or all of the outer surface of housing 8. Thus, outer sheet 25 may help in outputting a uniform light. In a non-illustrated embodiment similar outer sheets may be arranged between light orienting element and the housing sidewalls and/or the housing upstream walls. Additionally, or alternatively, lenses and/or reflectors may be located in the gap between the light orienting element and the housing.

Figure 17:
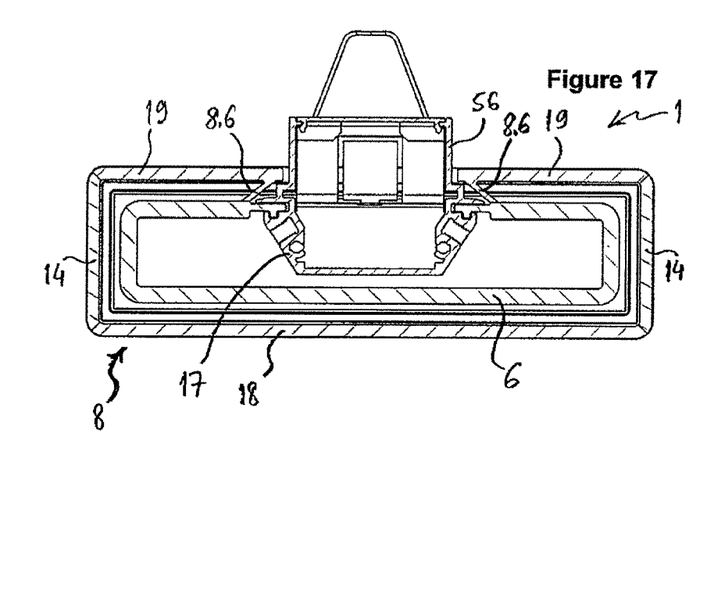
FIG. 17 is a view similar to FIG. 13 of a lamp including a lamp component according to a seventh embodiment.

FIG. 17 illustrates a lamp component 1 and a part of a lamp 51 according to a sixth embodiment, which is similar to the embodiment illustrated in FIGS. 13 to 16, and in which elements having similar or identical structure or function as in FIGS. 13 to 16 are given the same reference signs.

Lamp component 1 of FIG. 17 differs from lamp component 1 of FIGS. 13 to 16 in that housing 8 and light orienting element 6 are not one-piece, i.e., not co-extruded. Thus, lamp component 1 FIG. 17 may be comprised of five different elements, hence of 5 different materials with respective optical properties. Struts 8.6 of FIG. 17 are integral, and herein one-piece, with housing 8 and not with light orienting element 6, as made apparent in FIG. 17 by solid lines and by hatchings of different orientations.

Further, lamp component 1 of FIG. 17 differs from lamp component 1 of FIGS. 13 to 16 in that, like housing 8 of FIG. 12, housing 8 of FIG. 17 comprises different, separate walls, instead of being one-piece. Indeed, housing a of FIG. 17 comprises housing front wall 18, housing sidewalls 14 and housing upstream walls 19, the limits of which are made apparent by solid lines and by hatchings of different orientations.

Figure 18:
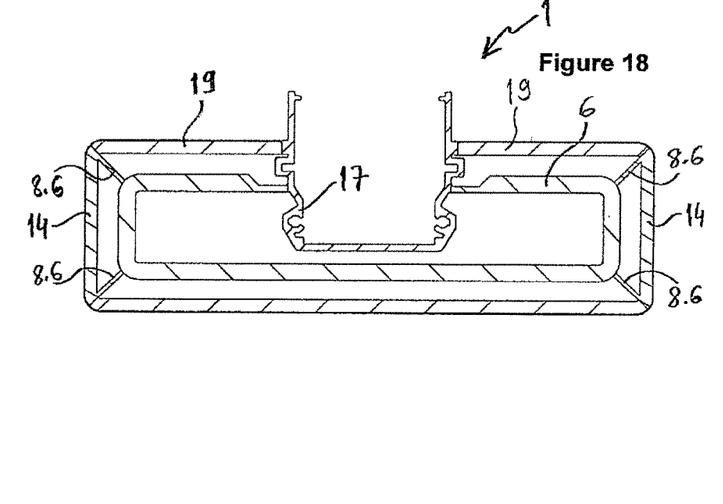
FIG. 18 is a view similar to FIG. 11 of a lamp component according to an eighth embodiment.

FIG. 18 illustrates a lamp component 1 according to a seventh embodiment, which is similar to the embodiment illustrated in FIG. 12, and in which elements having similar or identical structure or function as in FIG. 12 are given the same reference signs.

Lamp component 1 of FIG. 18 differs from lamp component 1 of FIG. 12 in that it further comprises four struts 8.6 spanning the gap between housing 8 and light orienting element 6. Two struts 8.6 belong to a housing sidewall 14, while the two other struts belong to the opposite housing sidewall 14. Each of struts 8.6 extends obliquely between housing 8 and light orienting element 6, such that all four struts somewhat converge towards a center point of the cross-section of lamp component 1. Thus, the oblique extension of struts 8.6 helps in transmitting mechanical forces in several directions.

In a non-illustrated embodiment attentive to FIG. 18, the struts may belong to the housing upstream wall and/or to the housing front wall instead of belonging to the housing sidewalls. Besides, additional struts may be arranged at similar locations as struts 8.6 of FIGS. 13 to 16.

In some or each of the illustrated embodiments, the housing front wall may be totally or partially transparent and the housing sidewalls may be configured to be totally or partially translucent, e.g., white. Alternatively, the housing sidewalls may be configured to be totally or partially i) transparent, ii) light scattering or iii) light deviating, while the housing front wall may be configured to be totally or partially transparent. Besides, the housing front wall and/or the housing sidewalls may be fitted with ribs and grooves as in FIGS. 3 and 4. Such ribs and grooves may be made using a laser or rollers easier during or after the extrusion step. Further, in some or each of the illustrated embodiments, the housing upstream walls may be configured to be totally or partially i) light scattering or ii) light diffusing.

Many other design configurations may be envisaged within the scope of the invention as defined in the appended claims. Thus, there are many design possibilities as to how the housing walls influence the light passing therethrough, hence as to the output light pattern.

According to a non-illustrated embodiment, the light orienting element may be substantially flat, instead of being substantially hollow, tubular as illustrated e.g., in the appended figures.

Although the invention has been described above in relation to the exemplary drawings, the invention is not limited to the embodiments described above and illustrated in the exemplary drawings. Many changes and alternatives may be made by the skilled person within the scope of the invention as defined in the appended claims.

What is claimed is:

1. A lamp component comprising:
   an input end configured to receive light from a light source;
   an output end configured to output at least a portion of the received light;
   a light directing element configured to receive light from the input end and to direct at least part of the received light towards the light output surface; and
   a housing configured to position the input end of the light orienting element proximate the light source, the housing having at least one housing sidewall configured to let light pass through it,
   wherein the light directing element is configured to deflect at least a portion of the received light towards the light output end to produce direct light, and to refract at least a portion of the received light towards the at least one housing sidewall to produce indirect light;
   wherein the light directing element is a first part having a constant cross section in first direction, and
   wherein the housing is a second part having a constant cross section the first direction.

2. The lamp component according to claim 1, wherein the first part and the second part are secured to one another.

3. The lamp component according to claim 1, the light directing element comprising a reflection layer arranged to reflect a fraction of the light towards the light output end, the reflection layer being a layer of the first part or a separate layer attached to the first part.

4. The lamp component according to claim 1, wherein the light directing element is made of a light-diffusing material selected from the group consisting of a polycarbonate (PC), a polymethyl-methacrylate (PMMA) and a polyamide (PA), the light-diffusing material comprising a diffusing component.

5. The lamp component according to claim 1, wherein the light directing element is configured to deflect a major fraction of the light towards the light output end, and to refract a minor fraction of the light towards the at least one housing sidewall, such that the ratio of the direct light to the indirect light ranges from 60/40 to 80/20.

6. The lamp component according to claim 1, the light directing element further comprises at least two upstream portions extending in the first direction and on both sides of the input end, each upstream portion having the general shape of a prism and configured to deflect light away from the light output end.

7. The lamp component according to claim 1, the housing further has a housing front wall facing the light output end, the housing front wall being one-piece with the at least one housing sidewall.

8. The lamp component according to claim 1, wherein the housing is made of a transparent material selected from the group consisting of a polycarbonate (PC), a polymethyl-methacrylate (PMMA), and a polyamide (PA).

9. The lamp component according to claim 1 further comprising at least one cover arranged at the front end or rear longitudinal end of the housing, the at least one cover being configured to surround the at least one crosswise region.

10. The lamp component according to claim 1, wherein the housing is composed of different walls including a housing front wall, housing sidewalls, and housing upstream walls.

11. The lamp component according to claim 1, wherein the lamp component further includes struts extending between the housing and the light directing element so as to mutually support and hold them and to stiffen the lamp component.

12. The lamp component according to claim 1, further comprising at least one of a light diffusing sheet, a lens, or a reflector located between the light directing element and the housing.

13. The lamp component according to claim 1, further comprising a thin outer sheet or layer of a transparent or translucent material, and at least partially covering the outer surface of the housing.

14. The lamp component according to claim 1, wherein the housing and the light directing element include a plurality of different elements or sections with respective optical properties.

15. A lamp for providing ambient light in a room, the lamp comprising:
   at least one lamp component according to claim 1, and
   at least one LED light source received in the input end of the lamp component,
   wherein the lamp has an emission angle between 270 and 360 degrees.

16. The lamp component according to claim 1 wherein the lamp component has a source region that includes at least one crosswise region extending across the first direction.

17. The lamp component according to claim 16, wherein the at least one crosswise region is located at a front end or at a rear end of the lamp component (1) on which a plurality of LEDs are supported so as to face a crosswise section of the light directing element when the lamp is in an assembled state.

18. The lamp component according to claim 1, wherein the lamp component further comprises a holder configured to allow holding of the lamp component by suspension cables.

19. The lamp component according to claim 18, wherein the holder extends along part or all of the length of the lamp component in the first direction.

20. The lamp component according to claim 1, wherein the light directing element comprises two lateral portions arranged between the light input end and the light output end, the lateral portions arranged to generally diverge from each other towards the light output end.

21. The lamp component according to claim 20, wherein at least one lateral portion extends parallel to the first direction, and at least one lateral portion having a generally flat planar shape.

22. The lamp component according to claim 20, wherein the light directing element further comprises a linking part arranged to link the lateral portions with each other, the linking part being integral with the lateral portions.

23. The lamp component according to claim 22, wherein the linking part has a generally flat cross section in the first direction, and a generally curved cross section in a direction transverse to the first direction, the curved cross section being concave with respect to the input end.

* * * * *